(12) United States Patent
Kim et al.

(10) Patent No.: US 10,539,908 B2
(45) Date of Patent: Jan. 21, 2020

(54) IMAGE FORMING APPARATUS AND METHOD FOR IMAGE FORMING

(71) Applicant: HP PRINTING KOREA CO., LTD., Suwon-si, Gyeonggi-do (KR)

(72) Inventors: Kyeong-man Kim, Yongin-si (KR); Hyun-soo Oh, Suwon-si (KR); Seong-wook Han, Yongin-si (KR); Yoon-tae Lee, Seoul (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 15/625,602

(22) Filed: Jun. 16, 2017

(65) Prior Publication Data

US 2018/0188669 A1     Jul. 5, 2018

(30) Foreign Application Priority Data

Dec. 29, 2016   (KR) ......................... 10-2016-0182495

(51) Int. Cl.
| | | |
|---|---|---|
| G03G 15/08 | (2006.01) | |
| G03G 15/00 | (2006.01) | |
| G03G 15/01 | (2006.01) | |

(52) U.S. Cl.
CPC ..... *G03G 15/0849* (2013.01); *G03G 15/0855* (2013.01); *G03G 15/5058* (2013.01); *G03G 15/0121* (2013.01)

(58) Field of Classification Search
CPC ........... G03G 15/0855; G03G 15/5058; G03G 15/0849; G03G 15/0121
See application file for complete search history.

(56) References Cited

U.S. PATENT DOCUMENTS

| | | | |
|---|---|---|---|
| 6,236,817 B1 | 5/2001 | Kim | |
| 8,229,308 B2 | 7/2012 | Shinichi | |
| 8,284,467 B2 | 10/2012 | Patton et al. | |
| 2003/0118358 A1 | 6/2003 | Ko | |
| 2008/0187337 A1* | 8/2008 | Kim ..................... | G03G 15/065 399/55 |
| 2009/0290883 A1 | 11/2009 | Nakahara | |
| 2010/0054769 A1* | 3/2010 | Adiletta ............. | G03G 15/0121 399/39 |
| 2012/0020694 A1* | 1/2012 | Shirata ............... | G03G 15/5016 399/81 |
| 2013/0034359 A1 | 2/2013 | Shirafuji et al. | |
| 2014/0064799 A1* | 3/2014 | Naruse ............... | G03G 15/0189 399/301 |
| 2015/0261479 A1 | 9/2015 | Park et al. | |

FOREIGN PATENT DOCUMENTS

| | | |
|---|---|---|
| JP | 5982784 B2 | 8/2016 |
| KR | 10-0173272 | 3/1999 |
| KR | 10-2000-0075261 | 12/2000 |
| KR | 1020040069735 | 8/2004 |
| KR | 10-1200415 | 11/2012 |

* cited by examiner

*Primary Examiner* — Ryan D Walsh
(74) *Attorney, Agent, or Firm* — Staas & Halsey LLP

(57) ABSTRACT

An image forming apparatus is provided. The image forming apparatus includes a sensor configured to sense a toner concentration, a processor configured to determine at least one of a coring level and a total area coverage (TAC) level according to the detected toner concentration, and an image former configured to print the rendered print data.

17 Claims, 11 Drawing Sheets

FIG. 9

Duis ~910

↓

Duis ~920

IMAGE FORMING APPARATUS AND METHOD FOR IMAGE FORMING

CROSS-REFERENCE TO RELATED APPLICATION

This application is based on and claims priority under 35 U.S.C. § 119 to Korean Patent Application No. 10-2016-0182495, filed in the Korean Intellectual Property Office on Dec. 29, 2016, the disclosure of which is incorporated by reference herein in its entirety.

BACKGROUND

1. Field

Apparatuses and methods consistent with what is disclosed herein relate to an image forming apparatus and an image forming method, and more particularly, to an image forming apparatus capable of adaptively saving a toner according to a toner concentration, and an image forming method thereof.

2. Description of Related Art

As computers are being increasingly widespread, penetration rates of computer peripherals are also increasing. As a representative example of the computer peripheral device, there can be mentioned a printer, a scanner, a copying machine, and an image forming apparatus such as a multifunction printer (MFP) having at least two functions of a printer, a scanner, and a copying machine.

In recent years, the recognition and regulation of eco-friendly society has been expanded, and eco-friendly elements have been introduced into the printing environment. Accordingly, in recent image forming apparatuses, various printing methods capable of reducing the amount of toner or the use of paper have been adopted.

However, in the conventional toner saving method, there is a problem that the output image is deteriorated by directly restricting the amount of the toner. Therefore, there is a need for a method that can save toner without degrading the quality of the output image or by minimizing the degradation of the quality of the output image.

SUMMARY

One or more exemplary embodiments provide an image forming apparatus capable of adaptively saving a toner according to a toner concentration, and an image forming method thereof.

According to an aspect of an exemplary embodiment, there is provided an image forming apparatus including: a sensor configured to sense a toner concentration; a processor configured to determine at least one of a coring level and a total area coverage (TAC) level according to the detected toner concentration; and an image former configured to print the rendered print data.

The processor may render a text object among the received print data by inserting a coring pattern in the text object according to the determined coring level.

The processor may determine a coring pattern based on at least one of a font type and font size of the text object, determine a number of patterns to be inserted based on the determined coring pattern and the coring level, and render the determined coring pattern by inserting the determined number of coring patterns in the text object.

The processor may render by reducing an amount of CMY toner and an amount of K toner based on the determined TAC level with respect to a graphic object and a photo object among the received print data.

The processor may convert an RGB color within the received print data to a CMYK color value using a color conversion table corresponding to the TAC level.

The processor may determine a print gamma level based on the detected toner concentration, and perform gamma adjustment to reflect the determined print gamma level in the rendered print data.

The image former may include a plurality of photosensitive drums, and the sensor may sense a toner concentration of each of the plurality of photosensitive drums using a registration sensor to arrange a color registration of the plurality of photosensitive drums.

The processor may determine a coring level based on a toner concentration of a K photosensitive drum among the plurality of photosensitive drums, and determine a TAC level based on a toner concentration of each of the plurality of photosensitive drums.

According to an aspect of an exemplary embodiment, there is provided an image forming method including: sensing a toner concentration; determining at least one of a coring level and a TAC level based on the sensed toner concentration; rendering the received print data based on at least one of the determined coring level and the TAC level; and printing the rendered print data.

The rendering may include rendering a text object among the received print data by inserting a coring pattern in the text object based on the determined coring level.

The rendering may include determining a coring pattern based on at least one of a font type and font size of the text object, determining a number of patterns to be inserted based on the determined coring pattern and the coring level, and rendering the determined coring pattern by inserting the determined number of coring patterns in the text object.

The rendering may include rendering by reducing an amount of CMY toner and an amount of K toner based on the determined TAC level with respect to a graphic object and a photo object among the received print data.

The rendering may include converting an RGB color within the received print data to a CMYK color value using a color conversion table corresponding to the TAC level.

The determining may further include determining a print gamma level based on the sensed toner concentration, and the method further may further include performing adjustment to reflect the determined print gamma level with respect to the rendered print data.

The sensing the toner concentration may include sensing a toner concentration of each of the plurality of photosensitive drums using a registration sensor to arrange a color registration of the plurality of photosensitive drums The determining may include determining a coring level based on a toner concentration of a K photosensitive drum among the plurality of photosensitive drums, and determining a TAC level based on a toner concentration of each of the plurality of photosensitive drums.

According to an aspect of an exemplary embodiment, there is provided a non-transitory computer-readable recording medium comprising a program for executing an image forming method, the image forming method including; a program for executing an image forming method, the image forming method including: sensing a toner concentration; determining at least one of a coring level and a TAC level based on the sensed toner concentration; rendering the received print data based on at least one of the determined coring level and the TAC level; and printing the rendered print data.

BRIEF DESCRIPTION OF THE DRAWINGS

The above and other aspects of one or more exemplary embodiments will become more apparent by reference to specific embodiments thereof which are illustrated in the appended drawings. Understanding that these drawings depict only exemplary embodiments of the disclosure and are not therefore to be considered to be limiting of the scope of the disclosure, the principles herein are described and explained with additional specificity and detail through the use of the accompanying drawings, in which:

FIG. 9 is a diagram illustrating a coring operation of the present disclosure;

DETAILED DESCRIPTION

One or more exemplary embodiments will be described below in greater detail with reference to the accompanying drawings. The example embodiments described below may be modified and implemented in various different forms. In order to more clearly describe the features of the example embodiments, a detailed description of known matters to those skilled in the art will be omitted.

Meanwhile, in the present disclosure, a case in which any one feature is connected with the other feature includes a case in which the features are directly connected with each other and a case in which the parts are electrically connected with each other with other features interposed therebetween. Further, when a certain feature is stated as "comprising" a certain feature, unless otherwise stated, this means that the certain feature may include another feature, rather than foreclosing the same.

The term "image forming job" as used herein may mean various jobs related to the image (e.g., printing, scanning or faxing), such as forming an image or creating/storing/transmitting an image file. In addition, "job" may mean not only an image forming operation but also a series of processes necessary for performing an image forming operation.

An image forming apparatus generally operates to print out print data generated at a terminal such as a computer onto a printing paper. An example of an image forming apparatus includes a copier, a printer, a facsimile and a multi function printer (MFP) that provides combined functionality of at least two of the single apparatuses. The image forming apparatus may refer to all apparatuses capable of performing an image forming operation, such as a printer, a scanner, a fax machine, an MFP, a display apparatus, or the like.

In addition, "hard copy" may refer to an operation of outputting an image on a printing medium such as paper, and the like, and "soft copy" may refer to an operation of outputting an image in a display apparatus, such as TV, monitor, and the like.

In addition, "content" may refer to all types of data that are subject to an image forming operation, such as photo, image, document file, or the like.

In addition, "print data" may refer to data that is converted into a format printable in a printer. Meanwhile, if a printer supports direct printing, the file itself may be print data.

In addition, "user" may refer to a person who performs an operation related to an image forming operation using an image forming apparatus or a device connected to the image forming apparatus via wire or wirelessly. In addition, "manager" may refer to a person who has the authority to access all functions and the system of the image forming apparatus. The "manager" and the "user" may be the same person.

Figure 1:
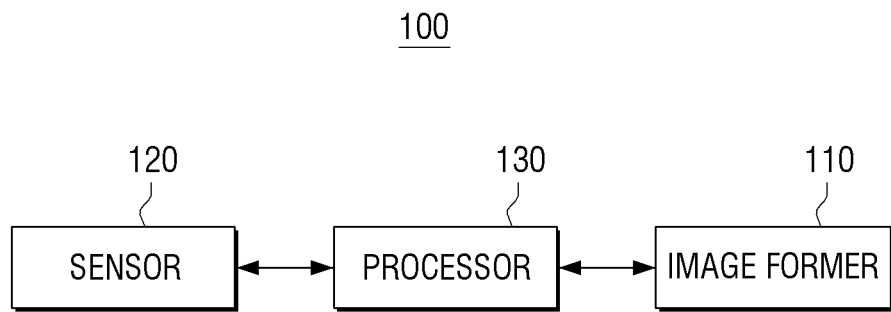
FIG. 1 is a block diagram illustrating brief configuration of the image forming apparatus according to an example embodiment.

FIG. 1 is a block diagram illustrating brief configuration of the image forming apparatus according to an example embodiment.

Referring to FIG. 1, the image forming apparatus 100 may include an image former 110, a sensor 120, and a processor 130.

The image former 110 may print the printing data. Specifically, the image former 110 prints print data which is rendered from the processor 130.

The image former 110 may form an image on the image forming medium on which the image is formed, such as the photosensitive drum, the intermediate transfer belt, or the sheet conveyance belt.

The image former 110 may form a predetermined mark for the color registration correction on the image forming medium. In this case, a total reflection pattern or a diffused reflection pattern may be used in the predetermined mark, and various patterns may be used according to a control method.

The detailed configuration of the image former 110 will be described later with reference to FIG. 3.

The sensor 120 senses a toner concentration. Specifically, the sensor 120 may emit light to a plurality of marks formed in the image forming medium, and sense a toner concentration by sensing the light reflected by the mark. The sensor 120 may use a registration sensor which arranges color registrations of a plurality of photosensitive drums, a concentration sensor, and a scanning device. The detailed configuration and operation of the sensor 120 will be described later with reference to FIG. 4.

The processor 130 may control each unit within the image forming apparatus 100. Specifically, the processor 130 may be implemented as a CPU, ASIC, and the like. Specifically, the processor 130 may control the image former 110 or the sensor 120 so that a current concentration of each of the photosensitive drums is sensed at predetermined intervals or at the time of a predetermined event. Such predetermined intervals and the time of the event may correspond to the time when color registration is performed (or the time when concentration correction is performed) or intervals at which color registration is performed (or the time when concentration correction is performed).

The processor 130 determines a concentration saving level according to the sensed toner concentration. In this case, the concentration saving level may be a coring level, a print gamma level, a TAC level, and the like. Specifically, the processor 130 may determine a coring level based on a concentration value with respect to toner K, and determine a TAC level or a print gamma level based on a concentration value of each of CMYK toners.

The three types of values of the concentration saving level are merely exemplary, and the things other than the above-mentioned levels are also applicable. Also, the correlation between the sensed concentration and the determined level may be optimized by experiment. Therefore, at the time of implementation, level values corresponding to an optimized concentration are stored in a lookup table method, and the processor 130 may determine a concentration saving level using a pre-stored lookup table.

Meanwhile, the processor 130 may determine that coring is not performed when the sensed toner concentration does not exceed the reference value. Specifically, the present disclosure is applicable when the image forming apparatus has a color value that exceeds the reference concentration in the state in which the image forming apparatus performs printing at a concentration of 100%.

Thus, conventionally, the image forming apparatus performs an operation to perform printing in a reference concentration through concentration correction. However, in the present disclosure, it is possible to perform an operation of saving a toner using coring and CMS methods instead of concentration correction. However, if the current toner manages to satisfy the default picture quality when the toner outputs at a 100% concentration, the processor 130 may determine not to perform toner saving when determining the concentration saving level.

In addition, when printing data is received through the communication interface unit 140, which will be described later, the processor 130 may perform rendering according to the determined concentration saving level with respect to the received print data.

Specifically, the processor 130 may divide the received print data by objects, and perform rendering to insert a coring pattern into a text object according to a coring level corresponding to the determined concentration saving level. In this case, the processor 130 may perform such operation only with respect to black text object among the text objects. However, at the time of implementation, the operation of inserting a coring pattern to a text in different color as well as black may be applied. An inserting operation of the coring pattern described above will be described below with reference to FIG. 9.

The processor 130 may perform rendering for reducing the amount of the CMY toner and reducing the amount of the K toner according to the TAC level corresponding to the determined concentration level for the graphics object and the photographic object. Such operation may be referred to as a CMS method, and the CMS method will be described with reference to FIG. 10.

In addition, the processor 130 may additionally perform gamma adjustment which reflects a print gamma level corresponding to the determined concentration level with respect to the rendered print data.

In addition, the processor 130 may control the image former 110 to print the rendered print data.

As described above, the image forming apparatus 100 according to the present disclosure automatically performs toner saving according to the sensed concentration, and thereby the toner amount can be reduced while maintaining the picture quality of the output.

Meanwhile, although the above illustrates and explains the simple constitution of the image forming apparatus, various new units may be additionally included in actual implementation. The relevant additional units will be explained below by referring to FIG. 2.

Figure 2:
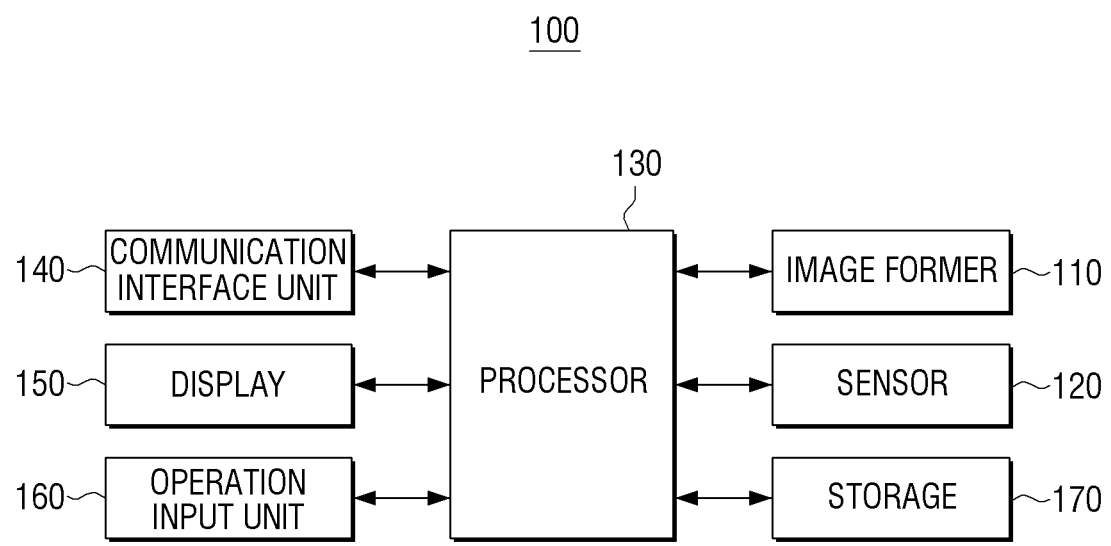
FIG. 2 is a block diagram illustrating a specific configuration of the image forming apparatus according to an example embodiment.

FIG. 2 is a block diagram illustrating a specific configuration of the image forming apparatus according to an example embodiment.

Referring to FIG. 2, the image forming apparatus 100 according to an example embodiment of the present disclosure includes an image former 110, a sensor 120, a processor 130, a communication interface unit 140, a display 150, an operation input unit 160, and a storage 170. The image forming apparatus 100 may be a copy machine that requires print density calibration, a printer, a facsimile, or a multi-function peripheral (MFP) in which two or more functions of the above-described devices are combined.

The image former 110, the sensor 120, and the processor 130 perform the same function as those of FIG. 1, and thus, the description thereof will be omitted.

The communication interface 140 is connected to print control terminal device (not illustrated), and receives print data from the print control terminal device. Specifically, the communication interface 110 is formed to connect the image forming apparatus 100 to an external device, and may be connected to the terminal device through not only a local area network (LAN) or the Internet but also a universal serial bus (USB) port or a wireless communication (e.g., Wi-Fi 802.11a/b/g/n, near field communication (NFC), or Bluetooth) port.

The display 150 may display various information provided from the image forming apparatus 100. Specifically, the display unit 150 may display a user interface window for selecting various functions provided in the image forming apparatus 100. The display 150 may be a monitor, such as liquid crystal display (LCD), CRT, OLED, and the like, and may be implemented by a touch screen that may simultaneously perform the function of the operation input unit 160 to be described later.

The display 150 may display a control menu for performing a function of the image forming apparatus 100.

In addition, the display apparatus 1500 may display an interface window for setting a concentration save level from the user. The example described above will be described below with reference to FIG. 7.

The above-described manual is displayed in the image forming apparatus 100, but the example is not limited thereto, and if the image forming apparatus 100 is operable by an additional external device (for example, smartphone), the image forming apparatus 100 may transmit information corresponding to the above-described manual to the external apparatus so that the above-described manual is displayed in the external device.

The operation input unit 160 may receive an input of user's function selection and a control command for the corresponding function. The function may include printing, copying, scanning, fax transmission, and the like. Such function control command may be received through a control menu displayed in the display 150.

The operation input unit 160 may be implemented as a plurality of buttons, keyboard, mouse, etc., and may also be implemented as a touch screen capable of simultaneously performing the functions of the display 150 described above.

In addition, a color registration command (or toner concentration detection command) may be received through the operation input unit 160. At the time of implementation, a color registration command may be received through an external device through a communication interface 140.

The storage 170 may store print data which is received through the communication interface 140. The storage 170 may be implemented by a storage medium in the image forming apparatus 100 or an external storage medium, for example, a removable disk including a USB memory, a storage medium connected to a host, or a web server through a network.

Further, the storage 170 may store a plurality of color conversion tables corresponding to a TAC level. In addition, the storage 170 may store information on a toner concentration which is detected in the sensor 120. Furthermore, the storage 170 may temporarily store print data which is rendered from the processor 130.

Figure 3:
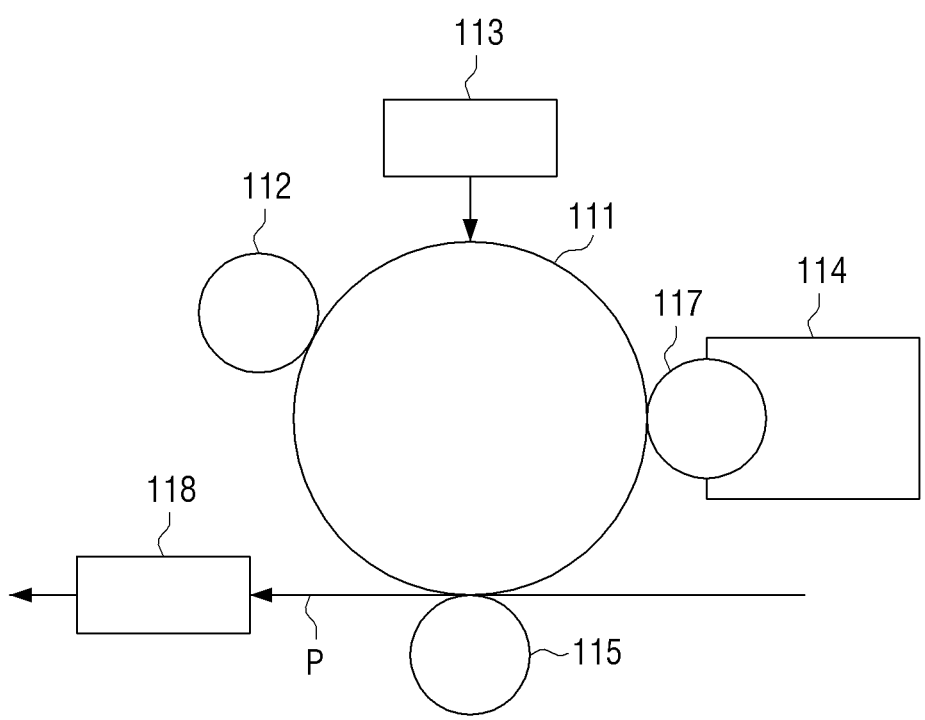
FIG. 3 is a view according to an example embodiment of an image forming unit of FIG. 1.

FIG. 3 is a view according to an example embodiment of an image forming unit of FIG. 1.

Referring to FIG. 3, the image former 110 may include a photosensitive drum 111, a charger 112, an exposure device 113, a developing device 114, a transfer device 115, and a fixing device 118.

The image former 110 may further include a feeding means (not illustrated) for supplying a recording means (P). An electrostatic latent image is formed in the photosensitive drum 111. The photosensitive drum 111 may be referred to as a photosensitive drum, a photosensitive belt, and the like, according to forms.

Hereinafter, for the convenience of explanation, the feature of the image former 110 corresponding to one color will be described as an example, but at the time of implementation, the image former 110 may include a plurality of photosensitive drums 111 corresponding to a plurality of colors, a plurality of chargers 112, a plurality of exposure devices 113 and a plurality of developing devices 114.

The charger 112 charges the surface of the photosensitive drum 111 to a uniform potential. The charger 112 may be implemented as a corona charger, a charging roller, a charging brush, and the like.

The exposure device 113 may change the surface potential of the photosensitive drum 111 based on information on an image to be printed to form an electrostatic latent image on the surface of the photosensitive drum 111. As an example, the exposure device 113 may electrostatic latent image by irradiating the photosensitive drum 111 with light modulated in accordance with the information on the image to be printed. An exposure device 113 of this type may be referred to as a light scanning device or the like, and an LED may be used as a light source.

The developing device 114 accommodates the developer therein, and supplies the developer to the electrostatic latent image to develop the electrostatic latent image into a visible image. The developing device 114 may include a developing roller 137 for supplying the developer to the electrostatic latent image. For example, the developer may be supplied from the developing roller 137 to the electrostatic latent image which is formed on the photosensitive drum 111 by the developing electric field formed between the developing roller 137 and the photosensitive drum 111.

The visible image which is formed on the photosensitive drum 111 is irradiated to a recording medium (P) by the transfer device 115 or an intermediate transfer belt (not illustrated). The transfer device 115 may transfer the visible image to a recording medium, for example, by the electrostatic transfer method. The visible image is attached to the recording medium (P) by electrostatic attraction.

The fixing device 118 fixes a visible image on the recording medium P by applying heat and/or pressure to a visible image on the recording medium P. The printing operation is completed by this series of processes.

The developer described above is used every time an image forming operation is made and exhausted when used for or more than a predetermined period of time. In such a case, it is necessary to replace the developer storage unit (for example, the developing device 114 described above). Components or configurative elements that may be replaced in the process of using an image forming apparatus are called consumable units or replaceable units. In addition, for proper management of the corresponding consumable unit, memory (or CRUM chip) may be attached to the consumable unit.

Figure 4:
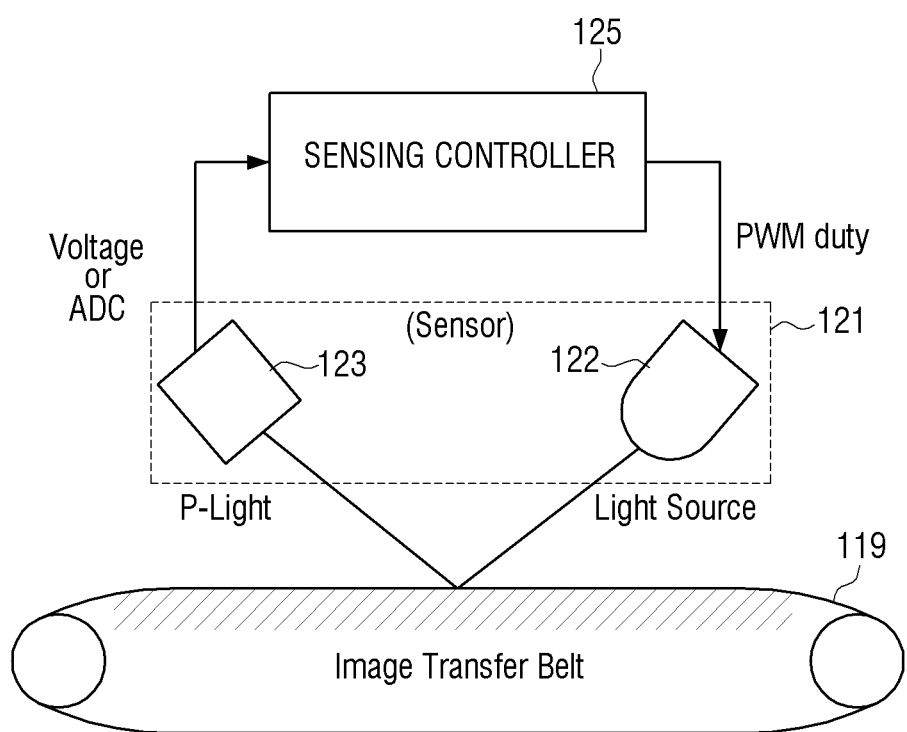
FIG. 4 is a diagram illustrating the detailed configuration of a sensor in FIG. 1.

FIG. 4 is a diagram illustrating the motor controller 200 of the image forming apparatus 100 of FIG. 1.

Referring to FIG. 4, the sensor according to the present disclosure may include a registration sensor. The registration sensor includes a registration sensor 121 and a sensing controller 125.

The registration sensor 121 includes a light emitting unit 122 and a light receiving unit 123. The light emitting unit 122 emits light to the image forming medium 180 at a constant level according to a control signal provided from the sensing controller 125. The light receiving unit 123 senses the light reflected from the image forming medium 180 among the light emitted from the light emitting unit 122. The light emitting unit 122 may be implemented by an LED. A control signal that is input to the light emitting unit 122 may be a PWM signal having a constant duty for controlling the quantity of light from the LED.

The sensing controller 125 controls the operation of the registration sensor 121. Although it is described that the sensing controller 125 performs only the operation of controlling the registration sensor in the example illustrated, at the time of implementation, the processor 130 may perform the operation of the sensing controller 125.

In addition, the sensing controller 125 controls the image former 110 to form a predetermined pattern on the image forming medium when a registration operation is required.

Further, the sensing controller 125 may control the registration sensor 121 to detect a concentration of a predetermined pattern. The detailed operation of the sensing controller 125 will be described below with reference to FIG. 5.

Meanwhile, it is described in FIG. 4 that the sensor 120 includes one registration sensor and one sensing controller. However, the color registration may be performed in two areas of the image forming medium. In such a case, the sensor 120 may include two registration sensors and two sensing controllers.

In addition, FIG. 4 is only an example embodiment in which a color registration sensor is used, and at the time of implementation, the sensor 120 may include a concentration sensor. Also, at the time of implementation, the sensor 120 may include a scanning device.

Figure 5:
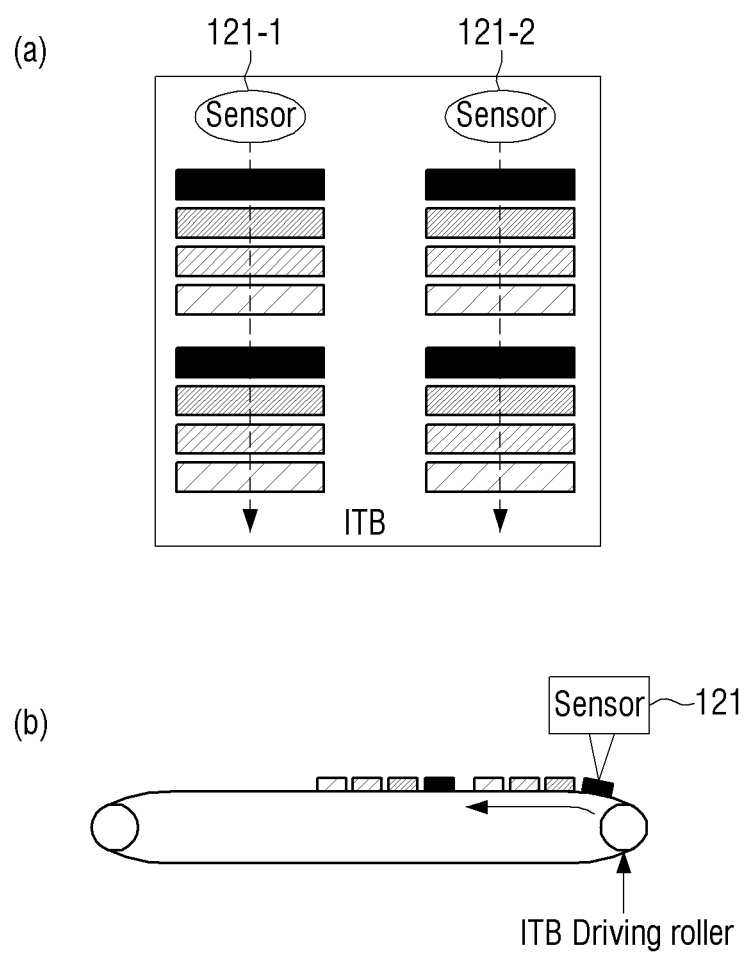
FIG. 5 is a diagram illustrating an operation of a sensor of FIG. 1.

FIG. 5 is a diagram illustrating an operation of a sensor of FIG. 1.

Referring to FIG. 5, the sensing controller 125 may control the image former 110 so that a plurality of photosensitive drums sequentially forms a predetermined pattern.

Accordingly, as illustrated in FIG. 5A, the image former 111 forms a pattern predetermined for the image forming medium at the bottom of each of the two registration sensors.

When the registration pattern is formed, the sensing controller 125 transmits a control signal that controls to irradiate a predetermined light amount to the formed pattern to the registration sensor 121-1 and 121-2.

The control signal is input to each registration sensor 121-1 and 121-2. Each registration sensor 121-1 and 121-2 irradiates light according to the input control signal. The light reflected from the image forming medium among the irradiated light is detected by the registration sensors 121-1 and 121-2, and the detected light is input to the sensing controller 125 again.

Through the process, the sensing controller 125 may detect a toner concentration of each photosensitive drum.

Meanwhile, in the case where the sensor 120 is implemented as a scanning device, the pattern described above may be printed on a print paper. The print paper on which the pattern is printed may be scanned through the scanning device, and thereby a toner concentration of each photosensitive drum may be detected.

Figure 6:
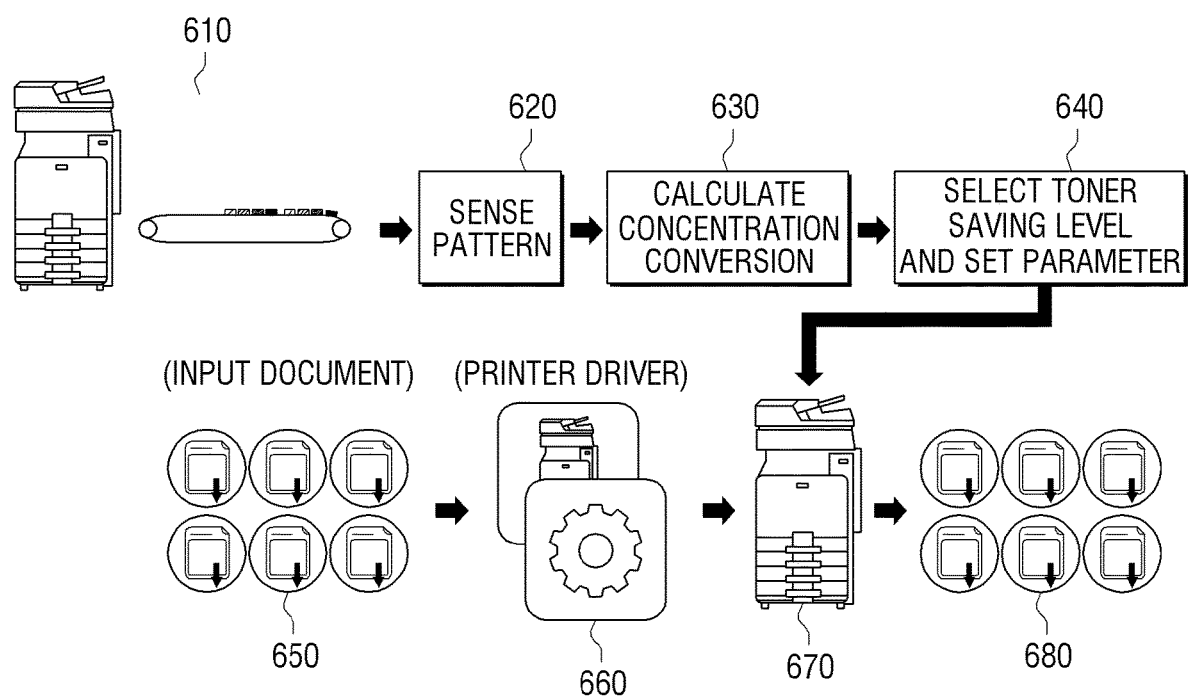
FIG. 6 is a diagram illustrating a toner saving method according to an exemplary embodiment.

FIG. 6 is a diagram illustrating a toner saving method according to an exemplary embodiment.

The conventional toner saving method aims only to reduce the overall toner consumption, and thus deteriorates without maintaining the image characteristics of the original image.

The present disclosure proposes a technique of reducing the image deterioration phenomenon to reduce the amount of toner consumption required at the time of printing while approaching the original image output.

The present disclosure also proposes a method of adaptively adjusting the toner consumption according to the characteristics of engine of the system. Specifically, the present disclosure proposes a technique of saving toner according to the degree of concentration output from the image forming apparatus. While saving toner, the present disclosure also aims to minimize the discrepancy between the original image quality output without toner saving and the image quality output by applying the toner saving according to the present disclosure.

Referring to FIG. 6, for the operation described above, the image forming apparatus includes, 610 and 620, a sensor capable of sensing a toner concentration in the image forming medium (ITB or OPC) 610 and 620, and sets the degree of coiling (or coiling level) and the parameter (or CMS level) of the CMS technique on rendering based on the calculated toner concentration, together with a calculation function for converting the sensor value to a concentration value.

By adjusting the degree of coring and parameter setting of the CMS technology, the image quality can be maintained and the amount of toner to be printed can be reduced. The coring level and the coring pattern are determined based on the degree of image quality determined above, and a table for adjusting the parameter of the CMS technology is pre-stored in the storage. Meanwhile, this table may vary depending on the image forming apparatus, and the corresponding table may be provided to firmware at the time of product launching. In addition, such table may be updated through firmware update, etc.

Hereinafter, a level which is determined based on the detected concentration will be described with reference to FIG. 7.

Figure 7:
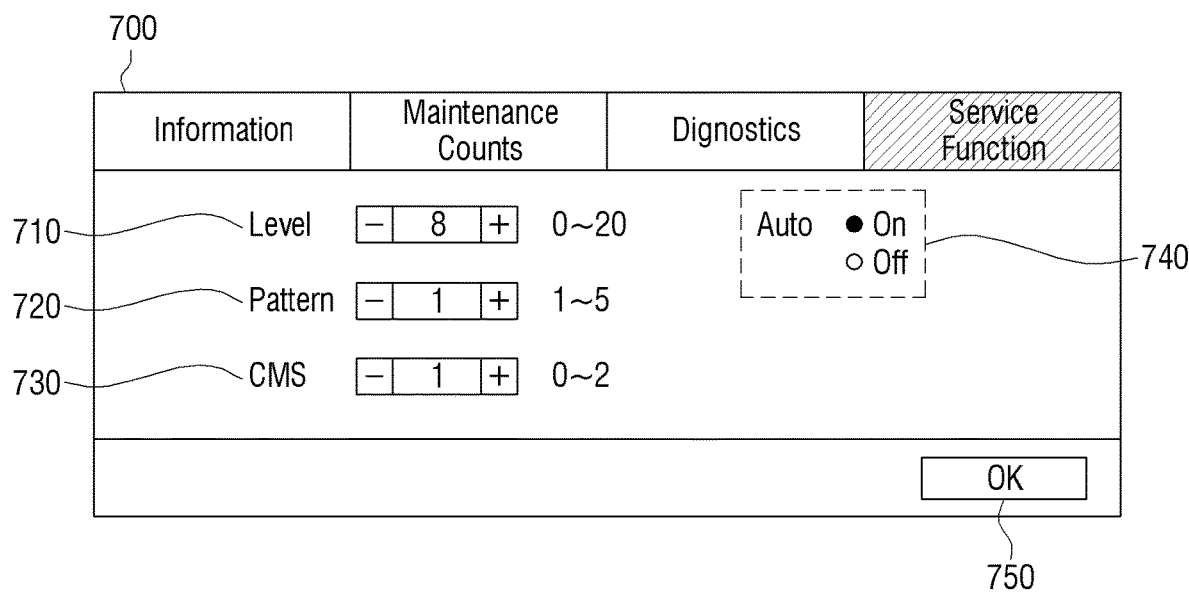
FIG. 7 is a diagram illustrating a user interface window that may be displayed in a display of FIG. 2.

FIG. 7 is a diagram illustrating a user interface window that may be displayed in a display of FIG. 2.

Referring to FIG. 7, the user interface 700 includes a coring level region 710, a coring pattern region 720, a CMS level region 730, a mode region 740, and a determination region 750.

The user interface 700 is a user interface window capable of displaying when a user selects a menu for toner saving, and the user may automatically or manually set whether to save toner using the mode region 740.

If the user manually sets the toner saving, the level may be determined by directly inputting or selecting a value in each of the coring level region 710, the coring pattern region 720, and the CMS level region 730.

If the toner saving is automatically set, the coring level, the CMS level, etc. may be determined based on the measured concentration value.

The coring level region 710 is a region to determine a coring level. If the toner saving is set as manual, any one from zero to 20 levels may be selected as illustrated.

In this case, the zero level is an option to which coring is not applied, and the 20 level is a level to which the maximum amount of coring is applied. In this case, the level may be a ratio of an area occupied by the coring to the entire area of the text. Therefore, the 20 level may refer to the case in which toner is disposed in 80% of the entire area and not in the remaining 20%. Accordingly, when the 20 level is applied, toner consumption may be reduced by 20% with respect to the text object.

However, since the present disclosure aims to not only save toner but also save toner without image deterioration, if automatic is set, a level that is virtually indistinguishable visually based on the detected K concentration can be determined based on the table provided by the manufacturer.

The coring pattern region 720 is a region to determine a coring pattern. Any one from zero to 5 levels may be selected. Here, 0 is a 1×1 pattern, 1 is a 1×2 pattern, 2 is a 2×2, 3 is an 'upside-down L' shape in 2×2 (i.e., three of four spaces are coringed and the lower left is not coringed), and 4 is an 'L' shape in 2×2 (i.e., three of four spaces are coringed and the upper right side is not coringed).

Meanwhile, at the time of implementation, a pattern other than the above-described pattern may be used.

If automatic is set, the coring pattern may automatically be determined according to a font size or port type of the text object. For example, any one of two to four may be applied to a font larger than a predetermined value, and zero to one may be applied to a font smaller than the predetermined value.

The CMS level 730 is an area which determines application information of the CMS scheme. Herein, 'zero' is an option in which toner saving is not performed, and '1' is an option to save the toner by setting the gamma to about 0.9 and the TAC to about 180% because the detected toner concentration is high. In addition, '2' is an option to save the toner by setting the gamma to about 0.8 and the TAC to about 160% because the detected toner is concentration is very high.

If automatic is set, '0', '1' and '2' may be automatically determined according to the detected concentration as described above. Although it is described above that all of the gamma level and the TAC level are determined according to the CMS level, at the time of implementation, only one of the gamma level and the TAC level may be selected according to the CMS level. At the time of implementation, each of the gamma level and the TAC level may be selected separately.

Although it is described above that any one of the three is determined according to the detected concentration, at the time of implementation, it may be divided into more than three levels and determined.

Figure 8:
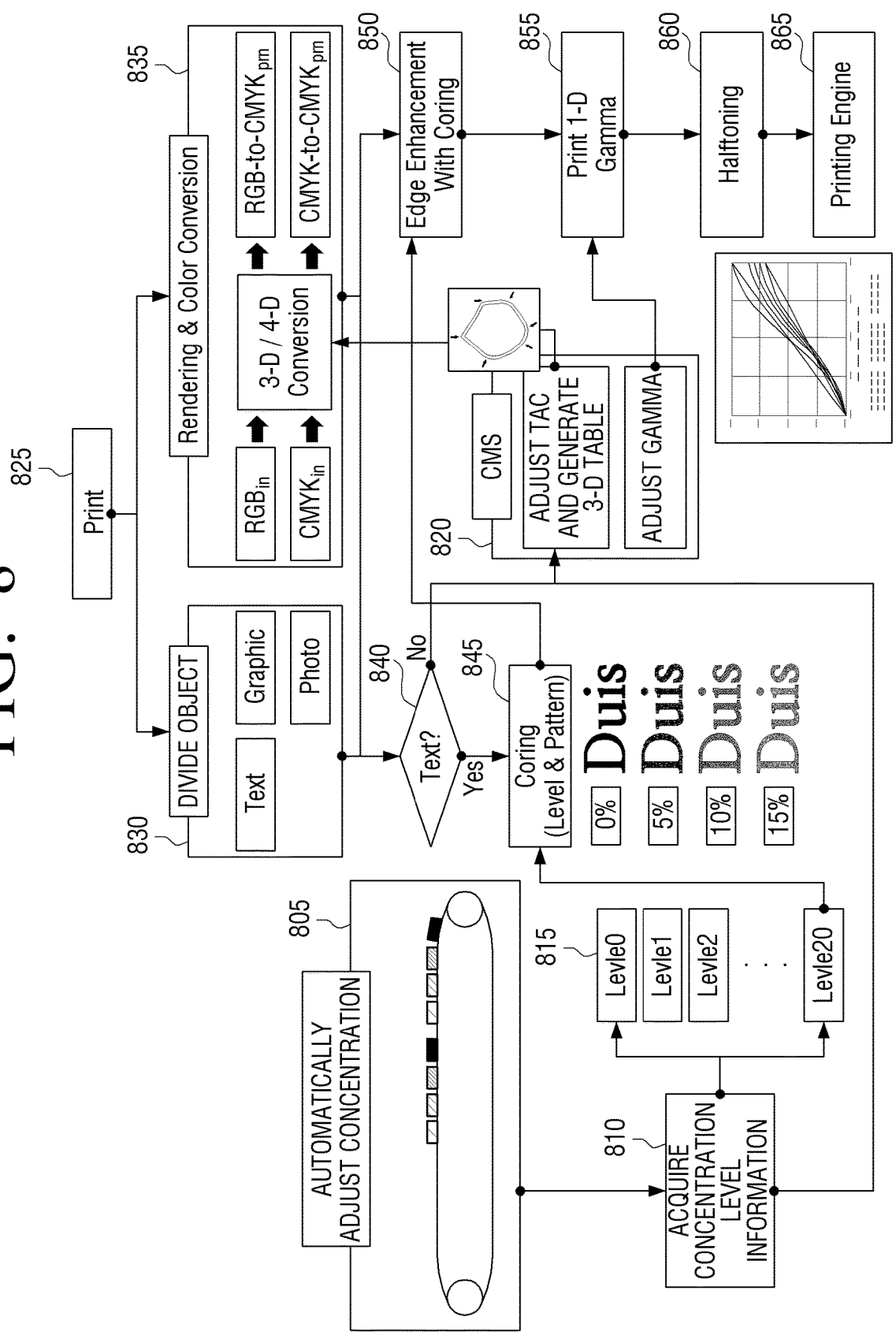
FIG. 8 is a diagram illustrating a rendering operation of a processor of FIG. 1.

FIG. 8 is a diagram illustrating a rendering operation of a processor of FIG. 1.

Referring to FIG. 8, first, a sensor is applied in the image forming apparatus to adjust a color output concentration, at 805. The sensor is installed in the image forming medium (ITB or OPC) of the color printing system, and includes a portion that radiates light to the ITB or OPC by a signal required at a specific printing time so that a concentration of the toner placed on the image forming medium is sensed and a portion that receives the light reflected therefrom and generate an electric signal.

The electric signal generated from this sensor is changed to a digital value through an Analog-to-Digital Converter (ADC) again, and an output concentration of the color printing system may be calculated using correlation formula between the digital value and the actual concentration.

In the present disclosure, the level and parameters for adjusting the coring and the CMS can be adaptively adjusted using the concentration as calculated above, and by such factor, an appropriate color printing can be maintained and adjusted, at 815 and 820.

Using this method, the parameters of the coring technology and the CMS technology are adjusted so that the CMYK output amount is adaptively changed according to the concentration of the printing system, resulting in adaptively saving the toner amount. The toner is adaptively saved according to the engine characteristics of the printing system, thereby maximizing reduction of the image quality deterioration phenomenon in the output image.

At the time of actual implementation, in the state in which a memory of a lookup table with respect to the toner saving level, coring level according thereto, and the CMS level, the above-described operation may be performed by selecting an appropriate level according to the concentration sensed at the time of printing. As described above, the present disclosure can apply toner saving of an appropriate level according to a concentration of an engine, minimizing printing time and reducing the toner efficiently.

Meanwhile, adjusting the coring and the CMS parameters according to the object of the image may have a more appropriate toner saving effect. Specifically, the toner can be saved by applying the coring technology to the text and the CMS technology to the objects other than the text.

Furthermore, in order to improve the accuracy with respect to the engine concentration, the concentration may also be acquired by using a scanner to reading an image fixed on the printing media instead of the concentration sensor.

Since a recent image forming apparatus includes a scanner, the image former may measure the concentration by directly printing a predetermined pattern on a print paper and scanning the print paper. Since the actually fixed image is used in this case, a toner spilling effect due to toner scattering or blur may be detected and controlled, and thereby the coring level and the CMS parameters can be adjusted more precisely.

Through the above-described process, the coring level and the CMS level may be determined, and when the printing data is subsequently received, at 825, the received printing data may be rendered.

First, the object is distinguished from the received print data, at 830, and with respect to the text object, coring may be reflected according to the predetermined coring level and rendered, at 845. Specifically, the coring pattern may be determined based on the font type and font size of the text object, and the number of coring patterns to be inserted may be determined based on the determined coring pattern and the predetermined coring level. In addition, the text object may be rendered by inserting the determined coring pattern of the determined number into the text object.

Further, rendering may be performed with respect to the graphic object and the photo object by reflecting the predetermined CMS scheme, at 835. Specifically, the RGB color value may be converted to the CMYK color value using the color conversion table corresponding to the predetermined CMS level. Herein, the color conversion table is a color conversion table which, unlike the existing conversion table, reduces the amount of CMY toner and the amount of K toner in the basic color conversion table.

In addition, rendering data may be produced by incorporating each object, and gamma is adjusted, at 855, to the produced rendering data, and finally, a plurality of binary data with respect to each of a plurality of photosensitive drums may be generated by performing half-toning. In addition, the generated binary data may be transmitted to the image former 110 to perform printing, at 865.

As described above, in the present disclosure, the degree of toner save is adaptively adjusted according to the toner concentration, and thereby the toner can be adjusted. Specifically, a set with high concentration may automatically increase the coring level by that amount, and even if the coring is applied, it is difficult to find a visually marked image defect in the final output printed on the paper.

In terms of color reproduction, parameters associated with the CMS may be automatically adjusted, and thereby there is almost no visible image defects while saving the toner.

The actual product to which the above-described method is applied will be described later with reference to FIG. 9.

Figure 9:
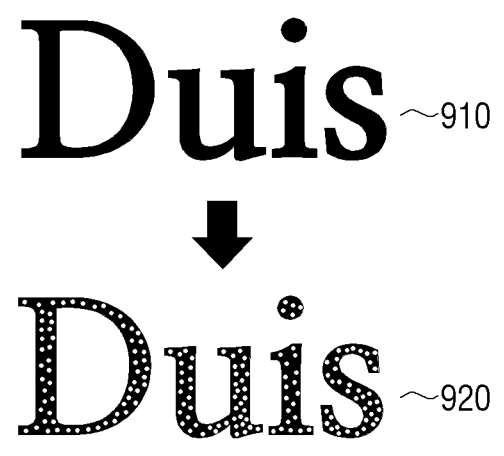

FIG. 9 is a diagram illustrating a coring operation of the present disclosure.

Referring to FIG. 9, when the coring is applied to a common text 910, it can be identified that a text 920 to which the coring is applied has an empty space therein.

The illustrated example illustrates an enlarged text and thus, the presence of coring is visually identifiable. However, the coring patterns such as 1×1, 2×2, and the like are considerably tiny, which makes it hard to visually identify it.

In the present disclosure, the number of corings inserted into the text may vary according to the toner concentration and thus, it is difficult for the user to discover the defect in the image by applying coring.

Figure 10:
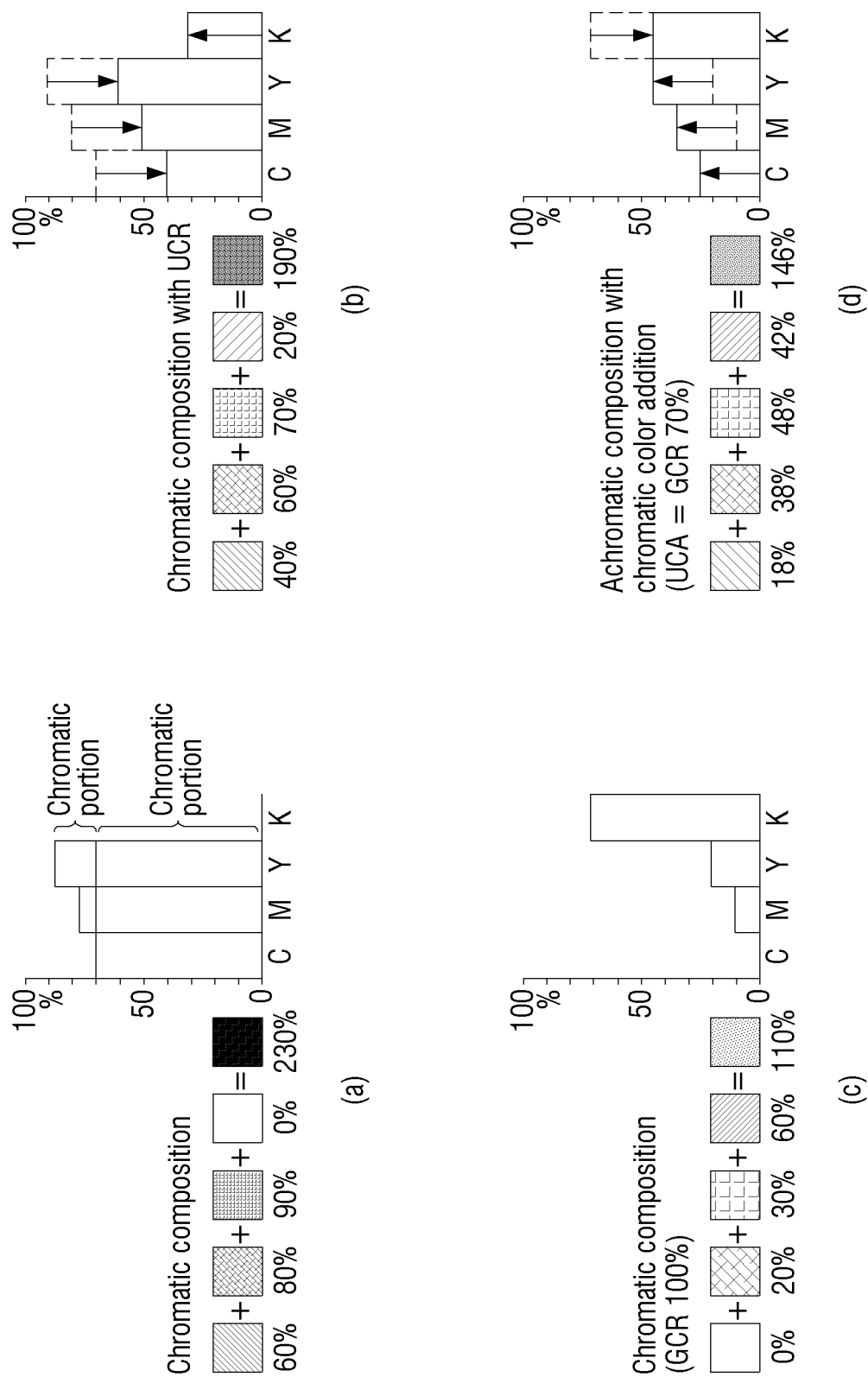
FIG. 10 is a diagram illustrating a color management scheme (CMS) of the present disclosure.

FIG. 10 is a diagram illustrating a color management scheme (CMS) of the present disclosure.

The CMS scheme is a scheme that uses more black toner, which is relatively cheaper, while reducing the consumption of cyan, magenta and yellow toners, which are more expensive.

Normally, GCR and UCR schemes are used, and the output image is almost similar to the method of reproduction which uses all of CMYK.

The print engine for colored output normally uses the CMYK toner, and an appropriate amount of CMYK toner is determined with respect to an image input using the color management scheme. In this case, UCR or GCR are commonly used, and an image that is finally divided into C/M/Y/K is called a separation image.

Herein, the CMYK separation may be changed by adjusting the amount of CMYK toner using the UCR and the GCR, and thereby the amount of CMY toner is decreased and the amount of K toner is relatively increased. There is little difference in the output image, but toner consumption and cost can be saved by adjusting the ratio of the toner used differently.

Referring to FIG. 10, FIG. 10A is a value of a CMYK separation to which the CMS scheme is not applied. Specifically, FIG. 10B is a separation value of each of the CMYK in the case where the UCR scheme is applied. FIG. 10C is a separation value of each of the CMYK in the case where the GCR scheme is applied 100%. FIG. 10D is a separation value of each of the CMYK in the case where the GCR scheme is applied 70%.

Herein, the UCR is a method of decreasing the value of CMY by a common ratio and decreasing K by that amount. In addition, the GCR is a method of converting all common values of the CMY into K. The above-described UCR and CMY are based on the fact that a color combination of CMY has a value of K.

By applying the CMS scheme such as UCR, GCR, and the like, it can be identified that the color image in which the total toner of 230 is required is adjusted between 110 and 190.

Figure 11:
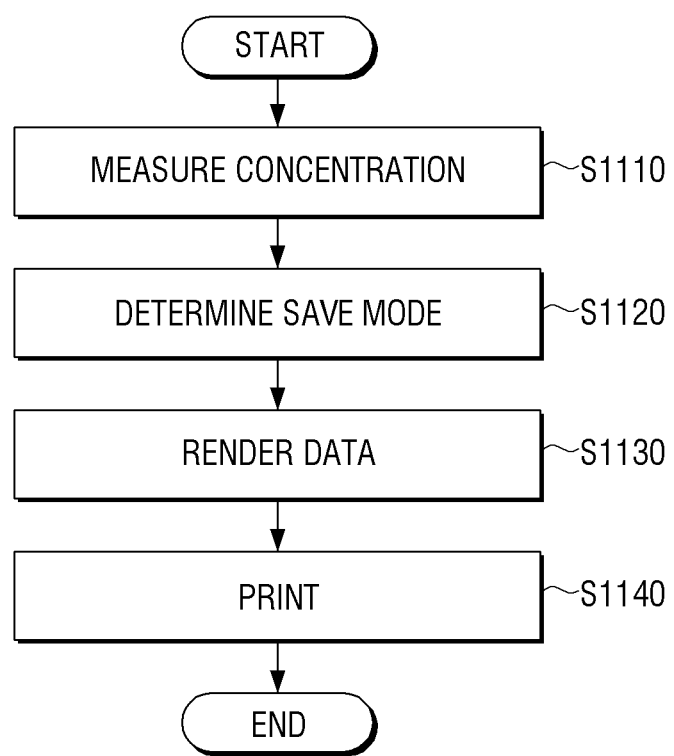
FIG. 11 is a flowchart illustrating an image forming method according to an example embodiment of the present disclosure.

FIG. 11 is a flowchart illustrating an image forming method according to an example embodiment of the present disclosure.

Referring to FIG. 11, the toner concentration is measured at operation S1110. Specifically, a toner concentration of each of a plurality of photosensitive drums may be detected using a registration sensor to arrange color registrations of the plurality of photosensitive drums.

Then, the concentration saving level is determined according to the detected toner concentration, at operation S1120. In this case, the concentration saving level may be a coring level, a print gamma level, a total area coverage (TAC) level, and the like. Specifically, the coring level may be determined based on the toner concentration of the K photosensitive drum among a plurality of photosensitive drums. In addition, the TAC level or the print gamma level may be determined based on the toner concentration of each of the plurality of photosensitive drums.

Then, the received print data is rendered based on the determined concentration saving level, at operation S1130. Specifically, for a text object among the received print data, rendering may be performed by inserting a coring pattern in the text object according to a coring level corresponding to the determined concentration saving level. More specifically, the coring pattern may be determined based on at least one of the font type and the font size of the text object. The number of patterns to be inserted may be determined according to the determined coring pattern and coring level. The determined number of coring patterns may be inserted in the text object and rendered.

In addition, for a graphic object and a photo object among the received print data, rendering which reduces the amount of CMY toner and the amount of K toner according to the TAC level corresponding to the determined concentration level may be performed. In this case, the RGB color within the received print data may be converted to the CMYK color value using the color conversion table corresponding to the TAC level.

In addition, gamma adjustment to reflect a print gamma level corresponding to the determined concentration level may be performed with respect to the rendered print data.

Finally, the finally rendered print data is output at operation S1140.

As described above, the image forming method according to the present disclosure automatically performs toner saving according to the sensed concentration, and thereby the toner amount can be reduced while maintaining the picture quality of the output. The image forming method of FIG. 11 may be performed on the image forming apparatus having the constitution of FIGS. 1 and 2, or performed on another image forming apparatus having different configuration.

In addition, the above-described image forming method may be realized as at least one execution program to execute the above-described image forming method, and such an execution program may be stored in a non-transitory computer-readable recording medium.

While the general inventive concept has been shown and described with reference to certain embodiments thereof, it will be understood by those skilled in the art that various changes in form and detail may be made therein without departing from the spirit and principles of the present general inventive concept, the scope of which is defined by the appended claims and their equivalents.

What is claimed is:

1. An image forming apparatus, comprising:
   an image former to transfer toner to an image forming medium, the image former to form an image based on image-forming data by transferring toner to the image forming medium;
   a sensor to detect a toner concentration of the toner transferred to the image forming medium; and
   a processor to:
      determine one or a combination of a coring level or a total area coverage (TAC) level, according to the detected toner concentration, and
      in response to the one or the combination of the determined coring level or the determined TAC level, control rendering the image-forming data according to at least one of the determined coring level and/or the determined TAC level, such that the image former is to form the image based on the rendered image-forming data.

2. The image forming apparatus as claimed in claim 1, wherein, in response to the image-forming data including a text object and the determined coring level, the processor controls rendering the text object included in the image-forming data by inserting a coring pattern in the text object according to the determined coring level.

3. The image forming apparatus as claimed in claim 2, wherein, while the processor controls rendering the text object included in the image-forming data, the processor
   determines the coring pattern based on a font type and/or a font size of the text object,
   determines a number of patterns to be inserted based on the determined coring pattern and the coring level, and
   controls rendering the determined coring pattern by inserting the determined number of coring patterns in the text object.

4. The image forming apparatus as claimed in claim 1, wherein, in response to the determined TAC level, the processor controls rendering the image-forming data by reducing an amount of CMY toner and an amount of K toner based on the determined TAC level with respect to a graphic object and a photo object among the image-forming data.

5. The image forming apparatus as claimed in claim 1, wherein, in response to the determined TAC level, the processor converts an RGB color within the image-forming data to a CMYK color value using a color conversion table corresponding to the determined TAC level.

6. The image forming apparatus as claimed in claim 1, wherein the processor
   determines an image-forming gamma level based on the detected toner concentration, and
   performs gamma adjustment to reflect the determined image-forming gamma level in the rendered image-forming data.

7. The image forming apparatus as claimed in claim 1, wherein:

the image forming medium includes a plurality of photosensitive drums, and the sensor detects a toner concentration of the toner transferred to at least one photosensitive drum from among the plurality of photosensitive drums using at least one registration sensor to arrange a color registration of the plurality of photosensitive drums.

8. The image forming apparatus as claimed in claim 7, wherein the processor determines the coring level based on a detected toner concentration of the toner transferred to a K photosensitive drum from among the plurality of photosensitive drums, and determines the TAC level based on the detected toner concentration of the toner transferred to each photosensitive drum from among the plurality of photosensitive drums.

9. A method for an image forming apparatus, the method comprising:

transferring toner, by an image former, to an image forming medium;

detecting, by a sensor, a toner concentration of the toner transferred to the image forming medium;

by a processor:
determining one or a combination of a coring level or a total area coverage (TAC) level, based on the detected toner concentration, and in response to the one or the combination of the determined coring level or the determined TAC level, controlling rendering image-forming data based on at least one of the determined coring level and/or the determined TAC level; and by the image former, forming an image based on the rendered image-forming data.

10. The method as claimed in claim 9, wherein the controlling rendering the image-forming data based on the determined coring level comprises, in response to the image forming data including a text object, controlling rendering the text object included in the image-forming data by inserting a coring pattern in the text object based on the determined coring level.

11. The method as claimed in claim 10, wherein the controlling rendering the text object included in the image-forming data comprises:

determining a coring pattern based on at least one of a font type and/or a font size of the text object, determining a number of patterns to be inserted based on the determined coring pattern and the coring level, and controlling rendering the determined coring pattern by inserting the determined number of coring patterns in the text object.

12. The method as claimed in claim 9, wherein the controlling rendering the image-forming data based on the determined TAC level comprises controlling rendering by reducing an amount of CMY toner and an amount of K toner based on the determined TAC level with respect to a graphic object and a photo object among the image-forming data.

13. The method as claimed in claim 9, wherein the controlling rendering the image-forming data based on the determined TAC level comprises converting an RGB color within the image-forming data to a CMYK color value using a color conversion table corresponding to the determined TAC level.

14. The method as claimed in claim 9, wherein the determining the one or the combination of the coring level or the TAC level comprises determining the image-forming gamma level based on the detected toner concentration, and wherein the method further comprises performing adjustment to reflect the determined image-forming gamma level with respect to the rendered image-forming data.

15. The method as claimed in claim 9, wherein
the image forming medium includes a plurality of photosensitive drums the sensing the toner concentration comprises sensing a toner concentration of the toner transferred to each photosensitive drum from among the plurality of photosensitive drums using at least one registration sensor to arrange a color registration of the plurality of photosensitive drums.

16. The method as claimed in claim 15, wherein the determining the at least one of the coring level and/or the TAC level comprises:

determining the coring level based on a toner concentration of the toner transferred to a K photosensitive drum from among the plurality of photosensitive drums, and determining the TAC level based on the detected toner concentration of the toner transferred to each photosensitive drum from among the plurality of photosensitive drums.

17. A non-transitory computer-readable recording medium comprising a computer-executable program for executing a method for an image forming apparatus, the method comprising:

transferring toner, by an image former, to an image forming medium;

detecting a toner concentration of the toner transferred to the image forming medium, by a sensor;

determining one or a combination of a coring level or a total area coverage (TAC) level, based on the detected toner concentration;

in response to the one or the combination of the determined coring level or the determined TAC level, rendering image-forming data based on at least one of the determined coring level and/or the determined TAC level; and by the image former, forming an image based on the rendered image-forming data.

* * * * *